(12) United States Patent
Brown

(10) Patent No.: US 10,523,766 B2
(45) Date of Patent: Dec. 31, 2019

(54) RESOLVING PATH STATE CONFLICTS IN INTERNET SMALL COMPUTER SYSTEM INTERFACES

(71) Applicant: Infinidat LTD., Herzliya (IL)

(72) Inventor: Eran Brown, Givatayim (IL)

(73) Assignee: INFINIDAT LTD, Herzliya ( * ) Notice: Subject to any disclaimer, the term of this patent is extended or adjusted under 35 U.S.C. 154(b) by 1161 days.

(21) Appl. No.: 14/836,980

(22) Filed: Aug. 27, 2015

(65) Prior Publication Data

US 2017/0064007 A1 Mar. 2, 2017

(51) Int. Cl.
*H04L 29/08* (2006.01)

(52) U.S. Cl.
CPC ................ *H04L 67/143* (2013.01)

(58) Field of Classification Search
CPC ....... H04L 41/08; H04L 43/08; G06F 3/0601; G06F 13/126; G06F 13/4282; G06F 3/0607; G06F 3/0653; G06F 11/3055; G06F 3/0614; G06F 3/0632; H03K 5/131
See application file for complete search history.

(56) References Cited

U.S. PATENT DOCUMENTS

| | | | |
|---|---|---|---|
| 7,844,584 B1* | 11/2010 | Griess | G06F 16/1774 707/704 |
| 2004/0030668 A1* | 2/2004 | Pawlowski | G06F 3/0607 |
| 2006/0107105 A1* | 5/2006 | Murakami | H04L 1/0061 714/4.5 |
| 2007/0088795 A1* | 4/2007 | Dunbar | H04L 67/1097 709/217 |
| 2008/0155571 A1* | 6/2008 | Kenan | G06F 9/542 719/326 |
| 2009/0248830 A1* | 10/2009 | Kodama | G06F 15/16 709/212 |
| 2012/0066399 A1* | 3/2012 | Marquardt | H04L 69/162 709/228 |
| 2015/0052273 A1* | 2/2015 | Nozaki | H04L 67/14 710/200 |

* cited by examiner

*Primary Examiner* — William G Trost, IV
*Assistant Examiner* — Imran Moorad
(74) *Attorney, Agent, or Firm* — Reches Patents

(57) ABSTRACT

A method for resolving conflicts related to states of multiple iSCSI sessions between an iSCSI initiator and an iSCSI target, the method may include: comparing between (a) iSCSI initiator information that is indicative of states of the multiple iSCSI sessions as viewed by the iSCSI initiator, and (b) iSCSI target information that is indicative of the states of the multiple iSCSI sessions as viewed by the iSCSI target; wherein the comparing is preceded by utilizing a non-iSCSI connection for gathering at least one of the iSCSI initiator information and the iSCSI target information; and participating in a resolution of a conflict related to a given iSCSI session out of the multiple iSCSI sessions when the comparing shows that a state of the given iSCSI session as indicated in the iSCSI initiator information conflicts with the state of the given iSCSI session as indicated in the iSCSI target information.

21 Claims, 4 Drawing Sheets

RESOLVING PATH STATE CONFLICTS IN INTERNET SMALL COMPUTER SYSTEM INTERFACES

BACKGROUND

The iSCSI (Internet Small Computer System Interface) is a networking protocol for carrying SCSI (Small Computer System Interface) commands from an initiator (e.g., host, client) to a target (e.g., a storage system) over IP (Internet Protocol) networks.

Multipathing is a technique for defining multiple I/O paths through which the initiator can reach a storage resource in the target. Multipathing allows accessing a single storage device through multiple paths that facilitate load-balanced and redundant access.

When using iSCSI, I/O paths are defined as TCP sessions between the host and the storage system. A session may include one or more TCP connections.

Chapter 7 of the iSCSI RFC 3270 describes thirteen valid states of an iSCSI connection (some are applicable to target only or to an initiator only), more than twenty connection state transitions, four session states and seven session state transitions. The connection state can influent the session that includes that connection, for example: when a first connection among connections participating in a session is transitioned to Logged_In state, the session state is transitioned from Active state to Logged_In; when at least one connection is established for the session, the session state transitions from a Free state to Active state; When the last connection that was in a Logged_in state ceased to be in Logged_In state, the session state changes from Logged_in state to Active state or failed state.

Given the complexity imposed by the numerous states and state transitions, and given that the initiator manages its own state machines independently from the state machines handled by the target, there may be situations where a state of a path, as defined in the host, conflicts the state of a path as defined at the storage system. For example, the host state for a certain path is defined as Logged-In while the storage state for the same path is defined as Free or Failed.

Once the host and the storage system loose synchronization with regard to a state of a session, the path cannot be recovered automatically and manual intervention is required. The loss of synchronization with regard to a state of a session that serves as a data path can lead to cases where the host sees multiple active paths while in fact there is only one path. This is a situation having a potential point of failure. In other cases, the storage may see multiple sessions, while the host sees only one session or none.

The loss of synchronization with regard to a state of a session between the storage and host has no resolution today in the iSCSI protocol. Therefore, there are some data centers that prefer using Fibre Channel instead of iSCSI between the host and the storage system.

There is a need to improve the resilience of paths and avoid dead-ends due to state consistency problems that are not resolved by the iSCSI protocol.

SUMMARY

There are provided systems, methods and non-transitory computer readable media, as illustrated in the claims.

According to an embodiment of the invention there may be provided a method for resolving conflicts related to states of multiple Internet Small Computer System Interface (iSCSI) sessions between an iSCSI initiator and an iSCSI target, the method may include comparing between (a) iSCSI initiator information that is indicative of states of the multiple iSCSI sessions as viewed by the iSCSI initiator, and (b) iSCSI target information that is indicative of the states of the multiple iSCSI sessions as viewed by the iSCSI target; wherein the comparing is preceded by utilizing a non-iSCSI connection for gathering at least one of the iSCSI initiator information and the iSCSI target information; and participating in a resolution of a conflict related to a given iSCSI session out of the multiple iSCSI sessions when the comparing shows that a state of the given iSCSI session as indicated in the iSCSI initiator information conflicts with the state of the given iSCSI session as indicated in the iSCSI target information.

The participating in the resolution of the conflict may include participating in the resolution only if the conflict is not resolvable by iSCSI.

The participating in the resolution of the conflict may include participating in a change of a state of the given iSCSI session as viewed by at least one of the iSCSI initiator and the iSCSI target.

The participating in the resolution of the conflict may include participating in a termination of the given iSCSI session.

The participating in the termination of the given iSCSI session may include requesting the iSCSI initiator to terminate the given iSCSI session.

The participating in the termination of the given iSCSI session may include requesting the iSCSI target to terminate the given iSCSI session.

The participating in the termination of the given iSCSI session may include terminating the given iSCSI session by the iSCSI initiator.

The method may include participating in the termination of the given iSCSI session when the given iSCSI session is alive only according to one of the iSCSI initiator information and the iSCSI target information.

The participating in the resolution of the conflict may include utilizing the non-iSCSI connection.

The participating in the resolution of the conflict may include utilizing an additional non-iSCSI connection that differs from the non-iSCSI connection.

According to an embodiment of the invention there may be provided a non-transitory computer readable medium that stores instructions that once executed by a computer cause the computer to resolve conflicts related to states of multiple Internet Small Computer System Interface (iSCSI) sessions between an iSCSI initiator and an iSCSI target, by comparing between (a) iSCSI initiator information that is indicative of states of the multiple iSCSI sessions as viewed by the iSCSI initiator, and (b) iSCSI target information that is indicative of the states of the multiple iSCSI sessions as viewed by the iSCSI target; wherein the comparing is preceded by utilizing a non-iSCSI connection for gathering at least one of the iSCSI initiator information and the iSCSI target information; and participating in a resolution of a conflict related to a given iSCSI session out of the multiple iSCSI sessions when the comparing shows that a state of the given iSCSI session as indicated in the iSCSI initiator information conflicts with the state of the given iSCSI session as indicated in the iSCSI target information.

The participating in the resolution of the conflict may include participating in the resolution only if the conflict is not resolvable by iSCSI.

The participating in the resolution of the conflict may include participating in a change of a state of the given iSCSI session as viewed by at least one of the iSCSI initiator and the iSCSI target.

The participating in the resolution of the conflict may include participating in a termination of the given iSCSI session.

The participating in the termination of the given iSCSI session may include requesting the iSCSI initiator to terminate the given iSCSI session.

The participating in the termination of the given iSCSI session may include requesting the iSCSI target to terminate the given iSCSI session.

The participating in the termination of the given iSCSI session may include terminating the given iSCSI session by the iSCSI initiator.

The non-transitory computer readable medium may store instructions for participating in the termination of the given iSCSI session when the given iSCSI session is alive only according to one of the iSCSI initiator information and the iSCSI target information.

The participating in the resolution of the conflict may include utilizing the non-iSCSI connection.

The participating in the resolution of the conflict may include utilizing an additional non-iSCSI connection that differs from the non-iSCSI connection.

According to an embodiment of the invention there may be provided a management unit for resolving conflicts related to states of multiple Internet Small Computer System Interface (iSCSI) sessions between an iSCSI initiator and an iSCSI target, by: comparing, by a hardware processor of the management unit, between (a) iSCSI initiator information that is indicative of states of the multiple iSCSI sessions as viewed by the iSCSI initiator, and (b) iSCSI target information that is indicative of the states of the multiple iSCSI sessions as viewed by the iSCSI target; wherein the comparing is preceded by utilizing a non-iSCSI connection for gathering at least one of the iSCSI initiator information and the iSCSI target information; and participating in a resolution of a conflict related to a given iSCSI session out of the multiple iSCSI sessions when the comparing shows that a state of the given iSCSI session as indicated in the iSCSI initiator information conflicts with the state of the given iSCSI session as indicated in the iSCSI target information. Any hardware processor may be included in the management unit including general purpose hardware processors, one or multiple core processors, digital signals processors, dedicated hardware accelerators and the like.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
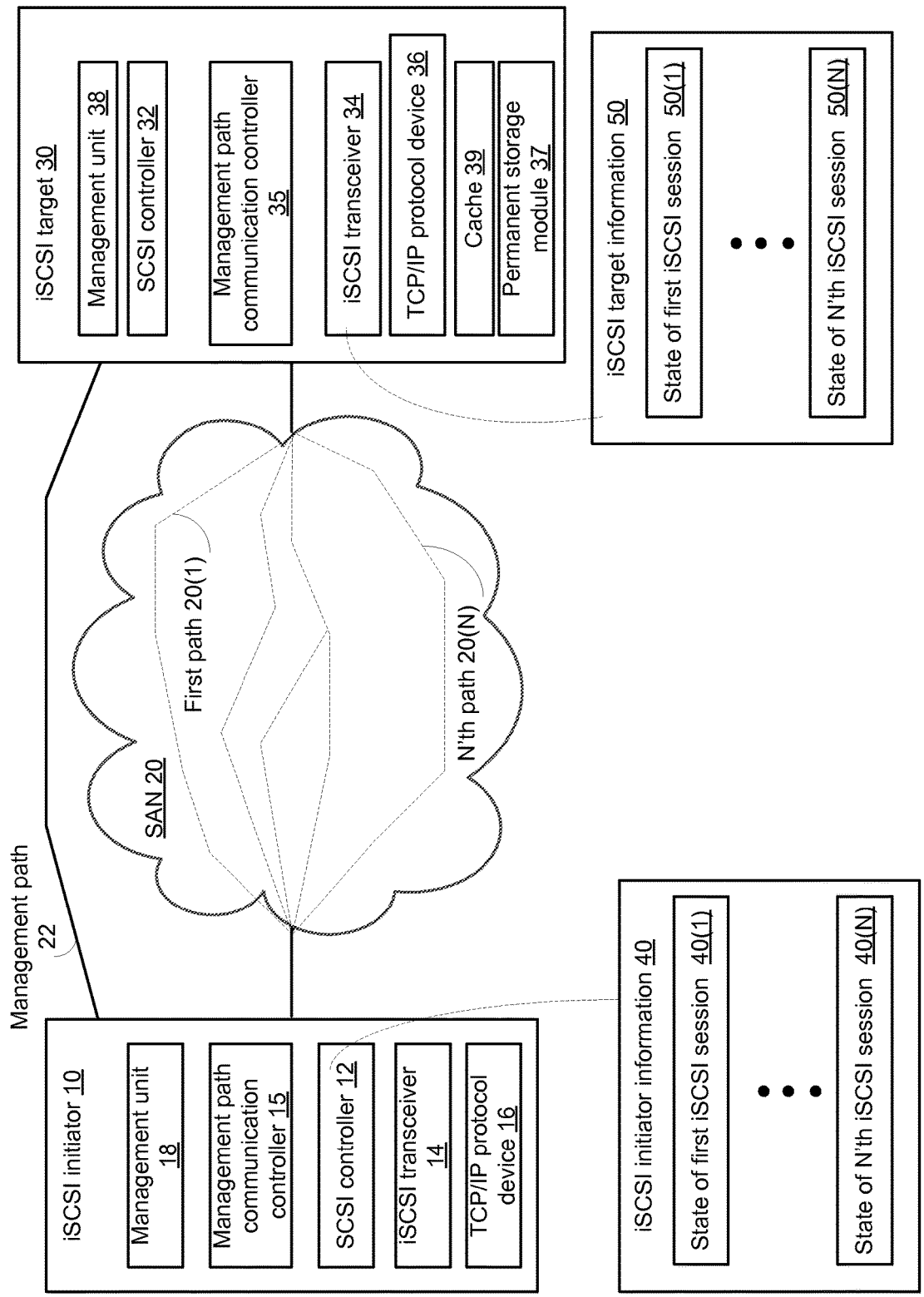
FIG. 1 illustrates an iSCSI target, an iSCSI initiator, and a Storage Area Network (SAN) according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The terms host, host computer and iSCSI initiator are used in an interchangeable manner.

The terms storage system and iSCSI target are used in an interchangeable manner.

According to embodiments of the invention there is provided a management path between an iSCSI initiator (host computer) and an iSCSI target that is a storage system. The management path may be used for comparing states of data paths (iSCSI sessions) between the host and the storage system. The management path can be also used for transmitting requests from the iSCSI initiator to the iSCSI target (or vice versa) that aim to resolve conflicts found in states of the data paths between the two parties that cannot be resolved via iSCSI.

The management path is not used for transferring SCSI messages and does not implement iSCSI protocol or any other data (I/O) protocol. The management path may use a web protocol such as HTTP/HTTPS protocol or any other management communication protocol that differs from iSCSI.

The management path may not be used as a data path and may not be used for transferring any other I/O messages.

FIG. 1 illustrates iSCSI initiator 10, SAN 20 and iSCSI target 30 according to an embodiment of the invention.

The iSCSI initiator 10 is illustrated as including management unit 18, SCSI controller 12, iSCSI transceiver 14, management path communication controller 15 and TCP/IP protocol device 16.

The iSCSI target 30 is illustrated as including management unit 38, SCSI controller 32, iSCSI transceiver 34, management path communication controller 35, TCP/IP protocol device 36, cache 39 and permanent storage module 37.

Each one of management units 18 and 38, SCSI controllers 12 and 32, iSCSI transceivers 14 and 24, management path communication controllers 15 and 35 as well as TCP/IP protocol devices 16 and 36 may be a hardware component (such as a hardware processor) or may be hosted by and/or executed by a hardware component (such as a hardware processor). The hardware processor may be a general purpose processor, a digital signal processor, a dedicated hardware and/or accelerator.

Multiple (such as N) paths 20(1)-20(N) should be opened between iSCSI initiator 10 (such as a host computer) and iSCSI target 30 in order to communicate I/O commands (e.g., SCSI commands) for accessing, by iSCSI initiator 10, data stored in cache 39 and permanent storage module 37 of iSCSI target 30. Communication over these paths is made using a protocol stack that includes iSCSI, SCSI and TCP/IP and Ethernet (or equivalent layer two protocol) layers. SCSI controllers 12 and 32, iSCSI transceivers 14 and 34 and TCP/IP protocol devices 16 and 36 participate in this communication.

Figure 2:
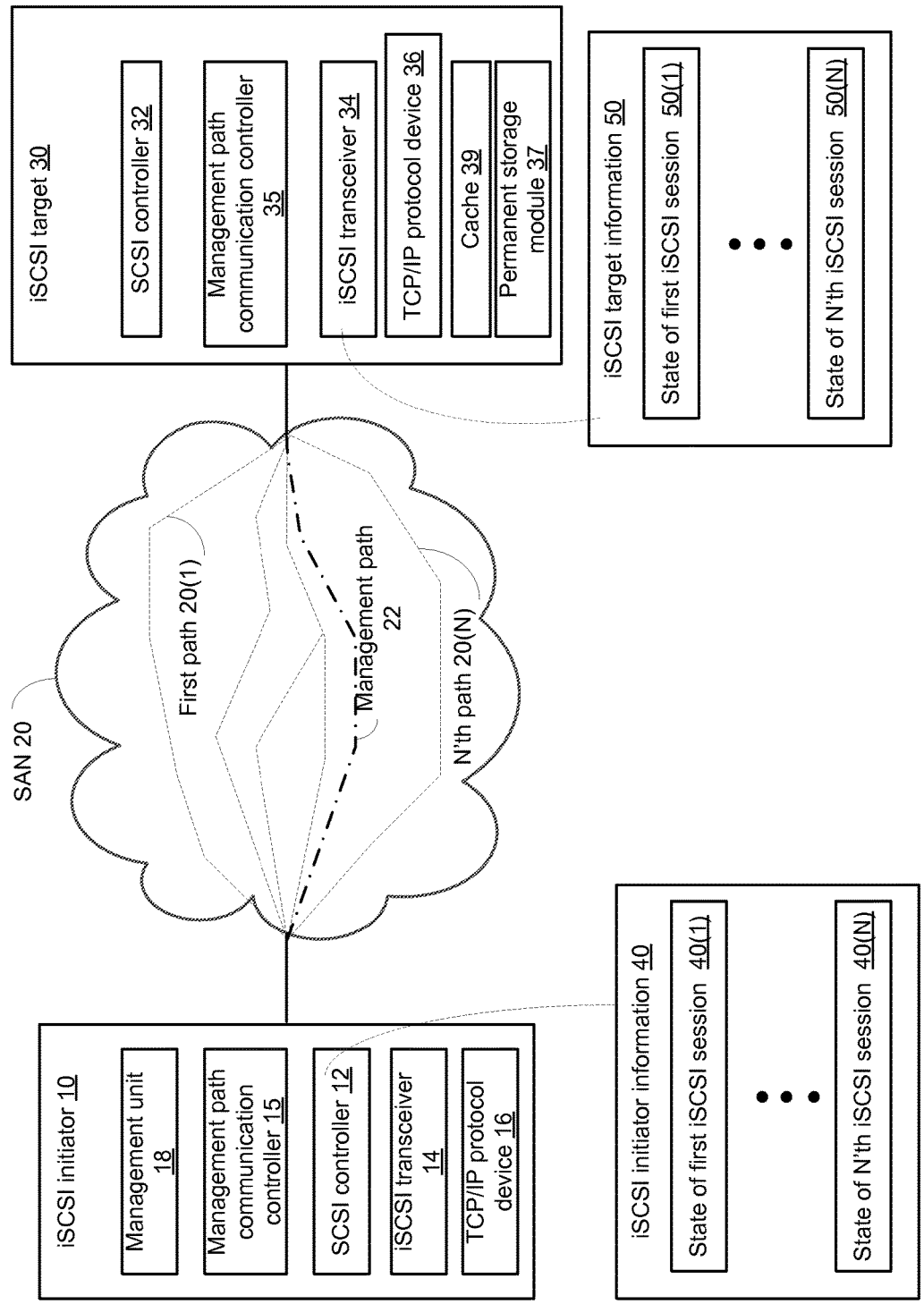
FIG. 2 illustrates an iSCSI target, an iSCSI initiator, and a Storage Area Network (SAN) according to an embodiment of the invention.
Figure 3:
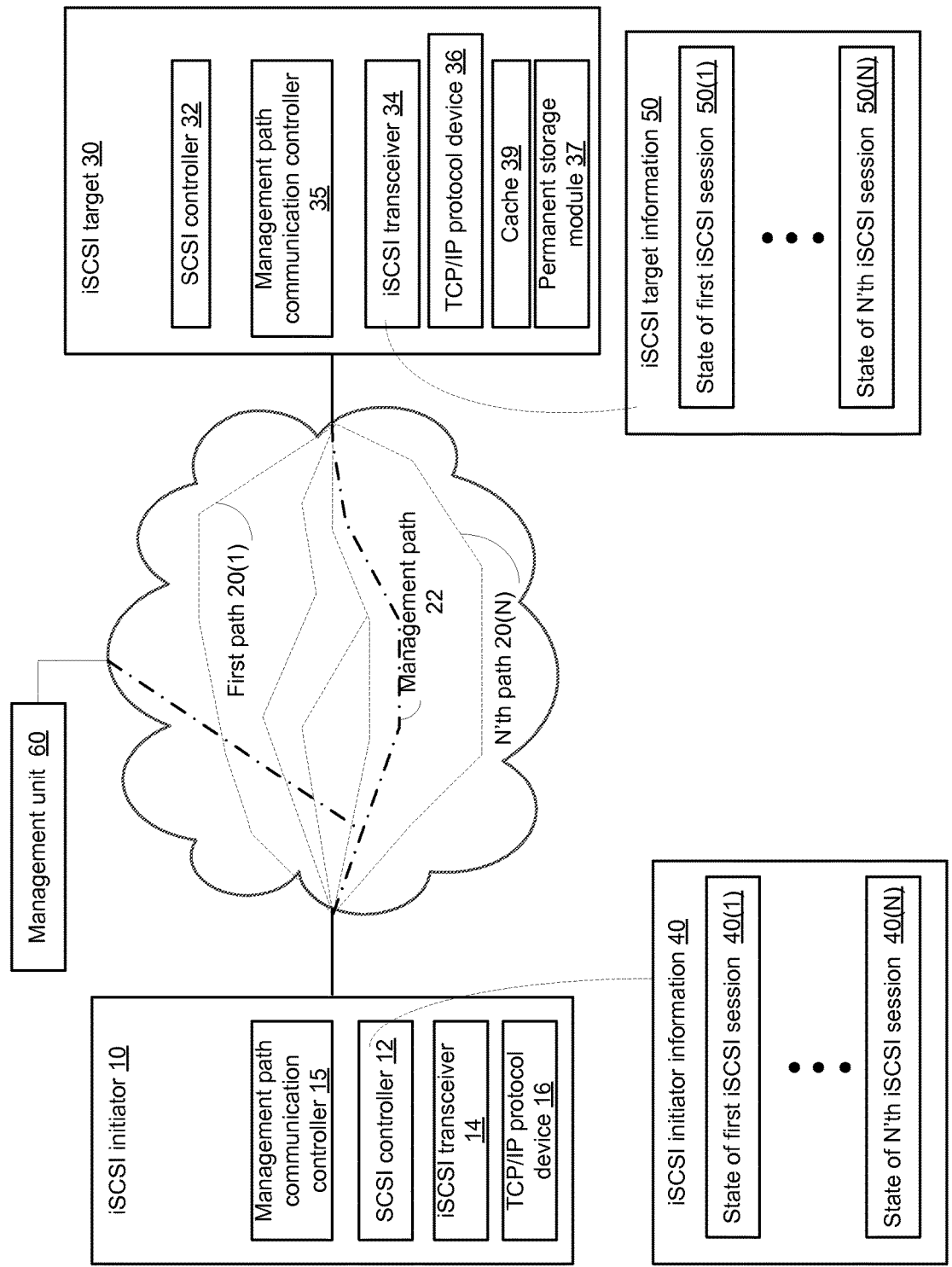
FIG. 3 illustrates an iSCSI target, an iSCSI initiator, and a Storage Area Network (SAN) according to an embodiment of the invention.

In addition—there is a management path 22 that is opened between the host and the storage system (the iSCSI initiator 10 and iSCSI target 30). The management path 22 may pass through SAN (see FIGS. 2 and 3), may pass outside SAN 20 or may only partially pass within SAN 20.

The iSCSI initiator 10 maintains iSCSI initiator information 40 about the state of the multiple paths (as viewed by iSCSI initiator 10)—corresponding to N iSCSI sessions—40(1)-40(N). The iSCSI initiator information 40 may use a state machine for managing states of each of the multiple paths.

The iSCSI target 30 maintains iSCSI target information 50 about the state of the multiple paths (as viewed by iSCSI target 30)—corresponding to N iSCSI sessions—40(1)-40(N). The iSCSI target information 50 may use a state machine for managing states of each of the multiple paths.

Prior to transmitting SCSI commands, at least one iSCSI session needs to be established by using an iSCSI session establishment messages, as defined in the iSCSI standard. During the iSCSI session establishment and upon its completion, both iSCSI target information 50 and iSCSI initiator information 40 are updated according to various state transitions. The iSCSI target information 50 and iSCSI initiator information 40 are also updated upon session termination process and according to various events during the life time of the iSCSI session, as defined in the iSCSI standard.

After the iSCSI session is established, SCSI commands can be transmitted through the iSCSI session. When transmitting a request (SCSI command) from iSCSI initiator 10 to iSCSI target 30 then SCSI controller 12 is configured to generate a storage request that include at least one SCSI command descriptor blocks. iSCSI transceiver 14 constructs iSCSI protocol data units. TCP/IP protocol device 16 transforms the iSCSI protocol data units into TCP segments, then into Internet Protocol (IP) packets and also configured to add an Ethernet layer header or any other layer two protocol header. IP packets are transmitted in the direction of iSCSI target 30 over one or more of multiple paths 20(1)-20(N).

The IP packets are received by TCP/IP protocol device 36 that generated TCP segments that are fed to iSCSI transceiver 34. iSCSI transceiver 34 generates from the TCP segments iSCSI protocol data units. SCSI controller 12 obtains SCSI command descriptor blocks from which storage commands are extracted.

iSCSI target 41 is a storage system and it is configured to execute the storage commands and to send an iSCSI response to iSCSI initiator 10. The iSCSI response follows a reverse flow as the iSCSI commands.

The communication over management path 22 is managed by management path communication controllers 15 and 35, which implement the management protocol, e.g., HTTPS protocol stack or SSL protocol stack.

According to an embodiment of the invention a comparison between the states of the multiple iSCSI sessions—as viewed by iSCSI initiator 10 and by iSCSI target 30 as well as a response to the outcome of the comparison is executed by either management unit 18 of iSCSI initiator 10, by management unit 38 of iSCSI target 30 or by both management units 18 and 38. The comparison may also be performed by a standalone appliance that is coupled to both iSCSI initiator 10 and by iSCSI target 30 (See, for example FIG. 3).

According to another embodiment of the invention (illustrated in FIG. 2) the comparison between the states of the multiple iSCSI sessions—as viewed by iSCSI initiator 10 and by iSCSI target 30 as well as a response to the outcome of the comparison is executed by management unit 18 of iSCSI initiator 10—and iSCSI target 30 does not include a management unit 38.

Under this embodiment management unit 18 of iSCSI initiator 10 queries (using management path 22) the iSCSI target 30 (especially the iSCSI transceiver 34 or a management unit—if such exists) for the iSCSI target information 50 (or any other information that represents the state of the multiple iSCSI sessions).

The iSCSI initiator 10 (especially management unit 18) may compare the iSCSI target information 50 to the iSCSI initiator information 40 in order to detect inconsistencies between the host side path states (as reflected by iSCSI initiator information 40) and the storage system side paths states (as reflected by iSCSI target information 50).

An inconsistency may be defined as states that are not equal between the host side and storage system side, or states that conflict with each other in a way that a timeout (or other tool used by the protocol for detecting dead-ends) cannot resolve.

For example, (i) if both storage-side state and host-side state of a certain session is Logged-In—then the states are consistent; (ii) if one state indicates Logged-In and the other state indicates Active—the states may be consistent, since this is a temporal situation, before both sides transition to Logged-In state; (iii) In case where one state is logged-in and the other is free or failed, it can be determined that the states are not consistent.

If the host and storage states of a certain session are not consistent, the following responses may be performed by the host:

A. Removing and reviving the session:
   a. If the states indicates that the certain session is alive only at the host side (i.e., the session was not reported by the storage system)—locally remove the session.
   b. If the states indicates that the certain session does not exist at the host side and is alive only at the storage side—request the storage system, via the management path and by using a management command (a proprietary message), to remove the certain session from the storage system.
   c. If both host and storage sees the certain session but the states conflict in a manner that is considered as a dead end that cannot be resolved by the iSCSI protocol—do both: (i) locally remove the session; and (ii) request the storage system, via the management path, to remove the session. A dead end that cannot be resolved by the iSCSI protocol can be a situation that the defined state transition would not resolve, or a situation where it is impossible to use protocol gracefully session termination.
   d. After performing each one of (a), (b) and (c) the iSCSI session may be re-established, using iSCSI session establishment, via the data paths.

B. inducing a change in the state of the path in at least one of iSCSI target 30 and iSCSI initiator 10.

It is noted that although the mentioned above text referred to management unit 18 of the iSCSI initiator 10 that performs the comparison and controls the response to the comparison—the comparison and/or a participation in the response (resolve conflicts) may be executed by the iSCSI target 30, by both iSCSI target 30 and iSCSI initiator 10 or by a management unit (such as management unit 60 of FIG. 3) that does not belong to either one of the iSCSI target 30 and iSCSI initiator 10 and communicates with both iSCSI target 30 and iSCSI initiator 10 via management paths.

Figure 4:
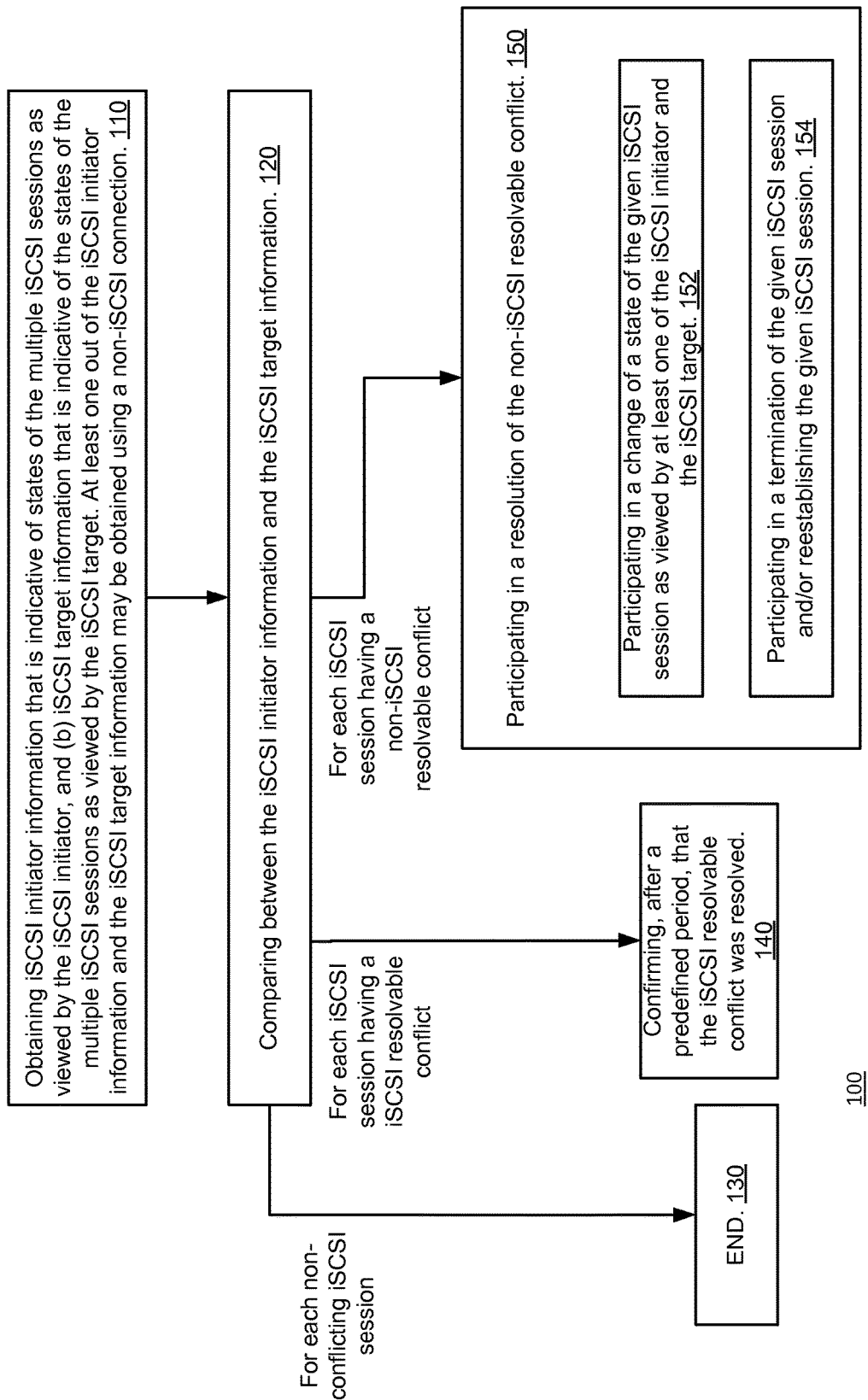
FIG. 4 illustrates a method according to an embodiment of the invention.

FIG. 4 illustrates method 100 according to an embodiment of the invention.

Method 100 is for resolving conflicts related to states of multiple iSCSI sessions between an iSCSI initiator and an iSCSI target.

Method 100 may start by step 110 of obtaining iSCSI initiator information that is indicative of states of the multiple iSCSI sessions as viewed by the iSCSI initiator, and (b) iSCSI target information that is indicative of the states of the multiple iSCSI sessions as viewed by the iSCSI target. At least one out of the iSCSI initiator information and the iSCSI target information may be obtained using a non-iSCSI connection (such as management path 22 of FIGS. 1-3).

Step 110 may be followed by step 120 of comparing between the iSCSI initiator information and the iSCSI target information.

The comparing may include comparing the states of each one of the iSCSI sessions—as viewed by the iSCSI target and as viewed by the iSCSI initiator. The comparing may further include checking whether all the iSCSI sessions as viewed by the iSCSI initiator are also viewed by the iSCSI target, and vice versa. The checking may use a session identifier assigned to each iSCSI session for verifying that all the session identifiers that appear in one view of the iSCSI sessions also appear in the other view.

For each iSCSI session whose states (as viewed by the both the iSCSI target and the iSCSI initiator) do not conflict—step 120 may be followed by END step 130.

For each iSCSI session whose states have an iSCSI resolvable conflict (for example a conflict that is only temporary—due to differences in timing of changes between states) then step 120 may be followed by step 140 of confirming, after a predefined period, that the iSCSI resolvable conflict was resolved.

For each iSCSI session whose states conflict cannot be resolved by the iSCSI protocol (dead end conflicts—iSCSI non-resolvable conflict) then step 120 may be followed by step 150 of participating in a resolution of the iSCSI non-resolvable conflict. The participating in a resolution of the iSCSI non-resolvable conflict may include sending a request (from the initiator to the target or vice versa or from a management unit 60 to both sides), via the non-iSCSI connection, to perform an action that is expected to resolve the conflict. The request can be a request to terminate the iSCSI session or a request to change a state of the iSCSI session.

Assuming that the iSCSI non-resolvable conflict relates to a given iSCSI session then step 150 may include one or more of steps 152 and 154. The iSCSI non-resolvable conflict may include one of the following situations: a session that exists only in the view of the iSCSI target, a session that exists only in the view of the iSCSI initiator, a session whose states in both views conflict.

Step 152 may include participating in a change of a state of the given iSCSI session as viewed by at least one of the iSCSI initiator and the iSCSI target. Step 152 may include determining the change that is required in the session's state of the iSCSI initiator and/or the session's state of the iSCSI target. For example, if the iSCSI initiator determines the change, then it can obtain all possible target session states that conform to the current initiator session state and choose a conforming target session state. The iSCSI initiator can then request the iSCSI target to change the target view of the session state to the conforming target session state. Alternatively, the iSCSI initiator can obtain all possible initiator session states that conform to the current target session state and choose a conforming initiator session state. The iSCSI initiator can then change the initiator view of the session state to the conforming initiator session state. An equivalent determination can be performed by the iSCSI target.

Step 152 may include at least one out of:
   a. Changing by the iSCSI initiator a state of the given iSCSI session.
   b. Changing by the iSCSI target the state of the given iSCSI session.
   c. Changing by both the iSCSI initiator and the iSCSI target the states of the given iSCSI session.
   d. Requesting from the iSCSI initiator to change the state of the given iSCSI session.
   e. Requesting from the iSCSI target to change the state of the given iSCSI session.
   f. Requesting from both the iSCSI initiator and the iSCSI target to change the states of the given iSCSI session.

The requesting to change the state (options d, e, and f) includes utilizing the non-iSCSI connection for transmitting the request and for receiving acknowledgment for the request.

Step 154 may include participating in a termination of the given iSCSI session. Additionally or alternatively, step 154 may include reestablishing the given iSCSI session.

Step 154 may include at least one out of:
a. Terminating, by the iSCSI initiator, the given iSCSI session.
b. Terminating, by the iSCSI target, the given iSCSI session.
c. Terminating, by the iSCSI initiator and by the iSCSI target, the given iSCSI session.
d. Requesting from the iSCSI initiator to terminate the given iSCSI session.
e. Requesting from the iSCSI target to terminate the given iSCSI session.
f. Requesting from both the iSCSI initiator and the iSCSI target to terminate the given iSCSI session.
g. Reestablishing, by the iSCSI initiator, the given iSCSI session.
h. Reestablishing, by the iSCSI target, the given iSCSI session.
i. Reestablishing, by the iSCSI initiator and by the iSCSI target, the given iSCSI session.
j. Requesting from the iSCSI initiator to Reestablish the given iSCSI session.
k. Requesting from the iSCSI target to Reestablish the given iSCSI session.
l. Requesting from both the iSCSI initiator and the iSCSI target to Reestablish the given iSCSI session.

Step 150 may include utilizing the non-iSCSI channel used in step 110 or using another non-iSCSI channel. The requesting to terminate the given iSCSI session (as in options d, e, f above) and the requesting to re-establish the given iSCSI session (as in options j, k, l above) may include transmitting a request to one or both of the parties (iSCSI initiator and/or iSCSI target) via the non-iSCSI channel. The request can be sent via the non-iSCSI channel from the iSCSI initiator to the iSCSI target, or from the iSCSI target to the iSCSI initiator, or from management unit 60 to both.

Step 110 and 120 may be repeated in a periodic manner, in any predefined manner, in fixed intervals, in varying length intervals, in a random manner and/or in a pseudo-random manner.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for resolving conflicts related to states of multiple Internet Small Computer System Interface (iSCSI) sessions between an iSCSI initiator and an iSCSI target, the method comprises:
    comparing between (a) iSCSI initiator information that is indicative of states of the multiple iSCSI sessions as viewed by the iSCSI initiator, and (b) iSCSI target information that is indicative of the states of the multiple iSCSI sessions as viewed by the iSCSI target;
    wherein the comparing is preceded by utilizing a non-iSCSI connection for gathering at least one of the iSCSI initiator information and the iSCSI target information; and
    participating in a resolution of a conflict related to a given iSCSI session out of the multiple iSCSI sessions when the comparing shows that a state of the given iSCSI session as indicated in the iSCSI initiator information conflicts with the state of the given iSCSI session as indicated in the iSCSI target information.

2. The method according to claim 1 wherein the participating in the resolution of the conflict comprises participating in the resolution only if the conflict is not resolvable by iSCSI.

3. The method according to claim 1 wherein the participating in the resolution of the conflict comprises participating in a change of a state of the given iSCSI session as viewed by at least one of the iSCSI initiator and the iSCSI target.

4. The method according to claim 1 wherein the participating in the resolution of the conflict comprises participating in a termination of the given iSCSI session.

5. The method according to claim 4 wherein the participating in the termination of the given iSCSI session comprises requesting the iSCSI initiator to terminate the given iSCSI session.

6. The method according to claim 4 wherein the participating in the termination of the given iSCSI session comprises requesting the iSCSI target to terminate the given iSCSI session.

7. The method according to claim 4 wherein the participating in the termination of the given iSCSI session comprises terminating the given iSCSI session by the iSCSI initiator.

8. The method according to claim 4 further comprising participating in the termination of the given iSCSI session when the given iSCSI session is alive only according to one of the iSCSI initiator information and the iSCSI target information.

9. The method according to claim 1 wherein the participating in the resolution of the conflict comprises utilizing the non-iSCSI connection.

10. The method according to claim 1 wherein the participating in the resolution of the conflict comprises utilizing an additional non-iSCSI connection that differs from the non-iSCSI connection.

11. A non-transitory computer readable medium that stores instructions that once executed by a computer cause the computer to resolve conflicts related to states of multiple Internet Small Computer System Interface (iSCSI) sessions between an iSCSI initiator and an iSCSI target, by:
    comparing between (a) iSCSI initiator information that is indicative of states of the multiple iSCSI sessions as viewed by the iSCSI initiator, and (b) iSCSI target information that is indicative of the states of the multiple iSCSI sessions as viewed by the iSCSI target;
    wherein the comparing is preceded by utilizing a non-iSCSI connection for gathering at least one of the iSCSI initiator information and the iSCSI target information; and
    participating in a resolution of a conflict related to a given iSCSI session out of the multiple iSCSI sessions when the comparing shows that a state of the given iSCSI session as indicated in the iSCSI initiator information conflicts with the state of the given iSCSI session as indicated in the iSCSI target information.

12. The non-transitory computer readable medium according to claim 11 wherein the participating in the resolution of the conflict comprises participating in the resolution only if the conflict is not resolvable by iSCSI.

13. The non-transitory computer readable medium according to claim 11 wherein the participating in the resolution of the conflict comprises participating in a change of a state of the given iSCSI session as viewed by at least one of the iSCSI initiator and the iSCSI target.

14. The non-transitory computer readable medium according to claim 11 wherein the participating in the resolution of the conflict comprises participating in a termination of the given iSCSI session.

15. The non-transitory computer readable medium according to claim 14 wherein the participating in the termination of the given iSCSI session comprises requesting the iSCSI initiator to terminate the given iSCSI session.

16. The non-transitory computer readable medium according to claim 14 wherein the participating in the termination of the given iSCSI session comprises requesting the iSCSI target to terminate the given iSCSI session.

17. The non-transitory computer readable medium according to claim 14 wherein the participating in the termination of the given iSCSI session comprises terminating the given iSCSI session by the iSCSI initiator.

18. The non-transitory computer readable medium according to claim 14 that stores instructions for participating in the termination of the given iSCSI session when the given iSCSI session is alive only according to one of the iSCSI initiator information and the iSCSI target information.

19. The non-transitory computer readable medium according to claim 11 wherein the participating in the resolution of the conflict comprises utilizing the non-iSCSI connection.

20. The non-transitory computer readable medium according to claim 11 wherein the participating in the resolution of the conflict comprises utilizing an additional non-iSCSI connection that differs from the non-iSCSI connection.

21. A management unit for resolving conflicts related to states of multiple Internet Small Computer System Interface (iSCSI) sessions between an iSCSI initiator and an iSCSI target, by:
   comparing, by a hardware processor of the management unit, between (a) iSCSI initiator information that is indicative of states of the multiple iSCSI sessions as viewed by the iSCSI initiator, and (b) iSCSI target information that is indicative of the states of the multiple iSCSI sessions as viewed by the iSCSI target;
   wherein the comparing is preceded by utilizing a non-iSCSI connection for gathering at least one of the iSCSI initiator information and the iSCSI target information; and
   participating in a resolution of a conflict related to a given iSCSI session out of the multiple iSCSI sessions when the comparing shows that a state of the given iSCSI session as indicated in the iSCSI initiator information conflicts with the state of the given iSCSI session as indicated in the iSCSI target information.

* * * * *